Aug. 26, 1952     C. R. KENNEDY     2,608,232
ANTISKID DEVICE FOR PNEUMATIC TIRES

Filed Feb. 16, 1948

Inventor
Chester R. Kennedy
by Roberts Cushman Crowe
Att'ys

Patented Aug. 26, 1952

2,608,232

UNITED STATES PATENT OFFICE 2,608,232

ANTISKID DEVICE FOR PNEUMATIC TIRES

Chester R. Kennedy, Lakeville, Mass.

Application February 16, 1948, Serial No. 8,617

2 Claims. (Cl. 152—221)

This invention pertains to anti-skid devices for pneumatic tires. The most common type of anti-skid device for use with a pneumatic tire consists of a series of short lengths of metal chain which extend across the tread of the tire and which are united at their opposite ends to annuli also consisting of link chain. To avoid too frequent contact of the cross chains with the same part of the tire tread, the cross chains and connecting annuli are made so loose that the anti-skid device is movable as a whole, relatively to the tire. While this type of anti-skid device is reasonably effective in soft snow or mud, the chains are noisy due to the loose arrangement; the cross chains are subject to rapid wear and breakage when run over a hard-surfaced road; they appear to accentuate the tendency of the vehicle to skid sidewise when running on ice; they are injurious to the tire, and such anti-skid devices are expensive to manufacture. I am aware that it has been proposed to cut old tires into segments and to connect these segments flexibly by means of chains or links, but such devices are expensive and difficult to make and have not gone into general use.

The principal object of the present invention is to provide a novel anti-skid device for use with pneumatic tires and which avoids the above disadvantages of the metallic chain type of anti-skid device, and which provides improved traction as compared with prior devices of this type. A further object is to provide an anti-skid device which is quiet regardless of the road surface over which the vehicle is moving; which affords good gripping traction in snow, mud or sand and which is as resistant to sidewise skidding as the tire itself; which is durable regardless of the type of road over which it is driven; which does not cut or otherwise injure the tire; which is very easy and inexpensive to manufacture; and which may readily be adjusted about the tire. A further object is to provide an anti-skid device which may be made from discarded tires of conventional construction, but without cutting them into separate segments thus utilizing material which is otherwise waste and the use of which actually adds to the life of the tire with which the anti-skid device is associated. Other and further objects and advantages of the invention will be pointed out in the following more detailed description and by reference to the accompanying drawings, wherein Fig. 1 is a side elevation of the improved antiskid device of the present invention, viewed from the inside, the uniting link being disconnected at one end;

Figures 1, 2:
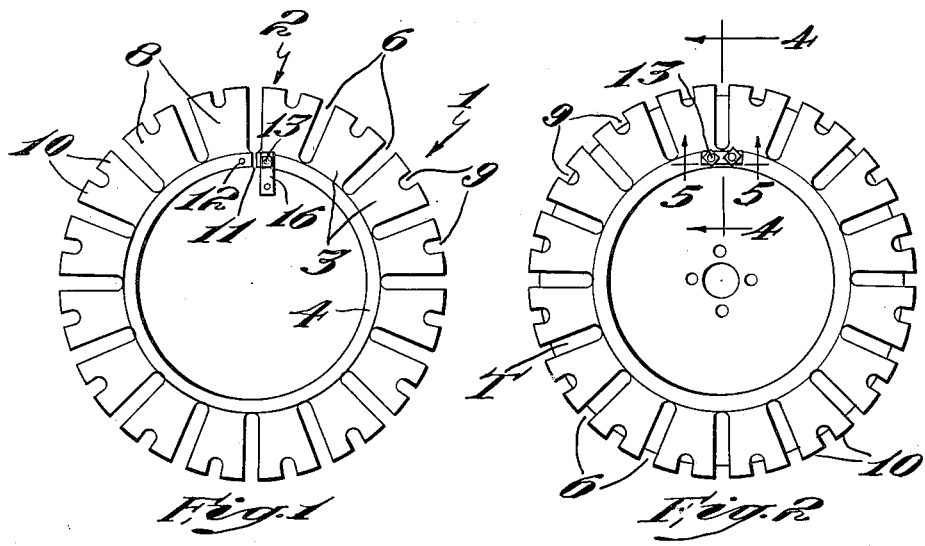
Fig. 2 is a side elevation of the anti-skid device, viewed from the outside, and showing it associated with a pneumatic tire.
Figure 3:
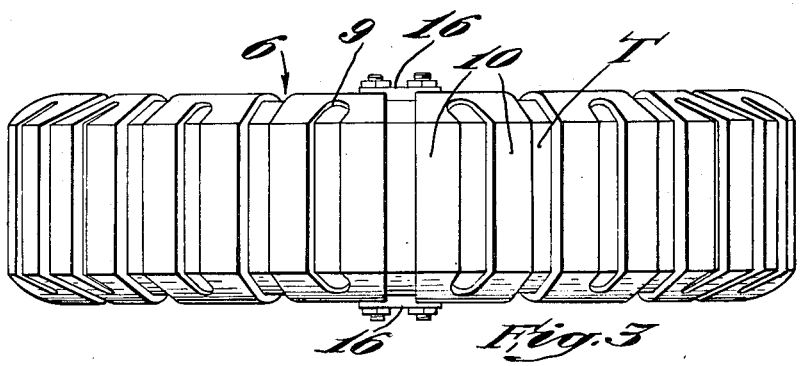
Fig. 3 is a plan view, to larger scale, the antiskid device being associated with a tire, showing the tread blocks of the anti-skid device.

Referring to the drawings, the numeral 1 designates the anti-skid device of the present invention as it appears before application to the tire with which it is to be used. This anti-skid device is preferably made from a discarded tire. Worn tires are available in ample numbers and at a very low price and it is thus preferable to use such discarded tires in making the improved antiskid device. However, it is to be understood that the anti-skid device of the present invention may be constructed from new materials if desired. In selecting a discarded tire for use in preparing the anti-skid device of the present invention, it is desirable that the discarded tire have remaining a continuous tread 2, although it is not essential that any substantial amount of the original rubber of the tread remain. It is also desirable that the side walls 3 of the discarded tire be intact and devoid of cracks or breaks. These side walls customarily terminate in bead portions 4 which are thicker and stronger than the side walls and which are substantially inextensible in a circumferential direction, usually having an internal metallic reinforce 5 consisting of wires or a wire cable. Customarily, the discarded tire has side wall and tread portions comprising textile fabric, this fabric having an outer covering of rubber which is thickened at the periphery to provide the tread.

Having provided a discarded tire having the above characteristics, the anti-skid device of the present invention is prepared by first slotting the discarded tire with radial slots 6 which extend through the tread portion and side walls and which terminate at the point 7 (Fig. 4) substantially at the junction of the side walls with the bead. These deep slots 6 are symmetrically arranged, being spaced at equal intervals around the periphery of the tire, thus providing a series of spaced segments 8 each united at its inner end to the bead at each side of the tire. Preferably these slots are of the order of one inch in circumferential width. Sixteen of these slots are here shown. Having prepared the deep slots 6, a second series of slots 9 is then formed, the slots 9 being located midway between adjacent slots 6 of the first series, and preferably extending through the tread portion only of the discarded tire. These slots 9 are also preferably of approximately one inch in circumferential width, and being disposed midway between adjacent slots 6 cooperate with the latter slots to form tread blocks 10 substantially uniformly spaced about the periphery of the discarded tire, these tread blocks being of substantially equal circumferential width.

The slots 6 and 9 may be formed in any desired manner, for example by the use of an appropriate rotary cutter operative to cut one slot at a time, the tire being turned through the proper angle between successive cuts. Instead of a rotary cutter, a die or punch may be employed. It is further contemplated that all of the slots of the series 6 and 9 may be formed at a single operation by the employment of a suitable die or other form of cutter.

Figures 4, 5:
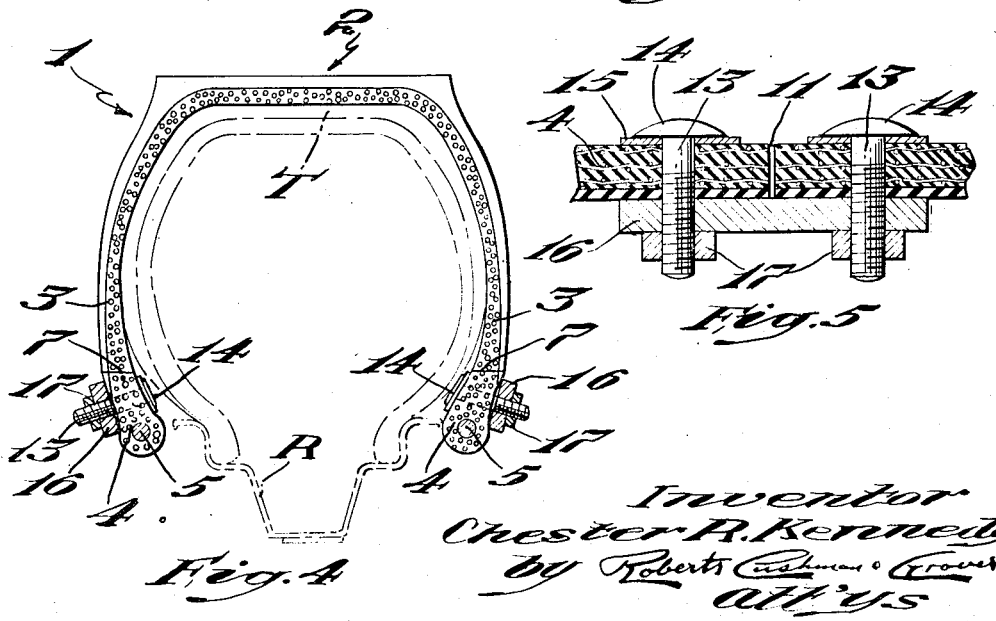
Fig. 4 is a diagrammatic section, to much larger scale than Fig. 2, suggesting the general character of the internal structure of the anti-skid device.
Fig. 5 is a fragmentary section, to much larger scale, showing a desirable device for releasably uniting the opposed end portions of the anti-skid device.

Having formed the slots 6 and 9, the discarded tire is then cut completely through its bead potions at one point, as indicated at 11 (Fig. 1) and at each side of this cut, holes 12 are formed extending through the thickness of the bead for the reception of bolts 13 (Fig. 5). The heads 14 of these bolts are arranged at the inside of the discarded tire, preferably with washers 15 beneath the heads 14, the bolts extending outwardly through the openings 12 and passing through holes in the opposite end portions of a rigid link 16. Preferably the holes 12 which receive the bolts 13 are spaced approximately two inches apart circumferentially of the bead, and the link 16 is of appropriate length to extend across the cut 11 in the tire and to receive the bolts 13. Nuts 17 engage the outer ends of the bolts 13 and hold the link 16 in place.

Instead of independent bolts 13, a pair of studs may be employed, fixed at their inner ends to a plate which would take the place of the two separate washers 15 shown in Fig. 5. Such an arrangement avoids the use of so many independent parts but would be a little more expensive to make.

In applying the anti-skid device thus provided to a tire T, the rim R with the tire T mounted thereon is first removed from the vehicle wheel and the tire T is partially deflated. The links 16 of the anti-skid device are disconnected from one or both of the respective bolts 13, thus permitting the anti-skid device to be expanded by separating its ends at opposite sides of the cut 11, and the anti-skid device is then wrapped about the tire T and properly adjusted so as to fit about the tire T. Then the links 16 are secured to the bolts 13 and the nuts 17 are tightened. The tire T is then inflated to the customary amount and thus exerts substantial radial pressure against the side walls 3 of the anti-skid device. Before inflating the tire T, the tread blocks 10 of the anti-skid device are manually adjusted relatively to each other until they are properly spaced apart, and when the tire T is fully inflated the anti-skid device is held firmly in place so that it does not slip relatively to the tire T, even when subjected to the heaviest traction.

Since the anti-skid device has the internal structure of a pneumatic tire with substantially inextensible bead portions and since its side walls are somewhat resilient and yielding, and its tread blocks 10 are of organic material and more or less resilient, the anti-skid device is substantially noiseless when in use; it is not rapidly worn by contact with bare road surfaces and it is resistant to wear by contact with gravel and road rocks. The circumferentially spaced tread blocks 10 afford very strong traction so that the anti-skid device is not only useful for winter driving purposes, but it is also useful in traveling over muddy roads or in sand, and may even be applied to passenger vehicles or light trucks for use in farm work.

While as here illustrated the bead portion of the discarded tire has been cut through at both sides of the tire it is contemplated that the bead need not be cut except at one side of the tire, leaving one bead intact. Such an arrangement may be applied to a pneumatic tire T by slipping it on from one side, although the application is somewhat more difficult than when the tire is cut through both beads and connecting links 16 are used at both sides of the tire.

While the simple link 16 with its attaching bolts 13 is useful and cheap to make and apply, it is contemplated that other customary forms of connection may be employed, for example a link having a turn buckle or the like, whereby its effective length may be varied. For ease in application it is preferred to make the anti-skid device from a discarded tire of a size somewhat greater than the tire with which it is to be used, although a discarded tire of the same size provides an anti-skid device which is useful and effective.

While one desirable embodiment of the invention has been illustrated and described by way of example, it is to be understood that the invention is broadly inclusive of any and all modifications falling within the scope of the appended claims.

I claim:

1. An anti-skid device for use with a pneumatic tire, said anti-skid device being a split discarded tire shoe including the original thick and strong metallic reinforce edge beads, the discarded shoe having a first circumferential series of spaced radial slot symmetrically disposed about the shoe and extending through the tread and side walls and which terminate adjacent to the bead at each side of the shoe and a second series of slots, each slot of the second series being located between two adjacent slots of the first series, the slots of the second series extending through the tread portion of the shoe but not extending substantially into the side walls of the shoe, and releasable metallic clamping means for uniting adjacent portions of the bead at opposite sides of the split.

2. An anti-skid device according to claim 1 wherein the first circumferential series of spaced radial slots are approximately 1 inch wide circumferentially of the shoe.

CHESTER R. KENNEDY.

REFERENCES CITED

The following references are of record in the file of this patent:

UNITED STATES PATENTS

| Number | Name | Date |
| --- | --- | --- |
| 1,459,377 | Peeples | June 19, 1923 |
| 1,570,851 | Metcalfe | Jan. 26, 1926 |
| 1,578,803 | Comey | Mar. 30, 1926 |
| 1,932,576 | Dodge | Oct. 31, 1933 |
| 1,965,073 | Ginsberg | July 3, 1934 |
| 2,050,202 | Sohl | Aug. 4, 1936 |
| 2,106,670 | Walker | Jan. 25, 1938 |

FOREIGN PATENTS

| Number | Country | Date |
| --- | --- | --- |
| 163,749 | Switzerland | Aug. 31, 1933 |
| 525,757 | Great Britain | Sept. 2, 1940 |